(12) United States Patent
Miller et al.

(10) Patent No.: US 7,549,122 B2
(45) Date of Patent: Jun. 16, 2009

(54) OBJECT SELECTION USING HIT TEST TRACKS

(75) Inventors: Gavin Stuart Peter Miller, Mountain View, CA (US); Eric Michael Hoffert, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 11/432,217

(22) Filed: May 10, 2006

(65) Prior Publication Data

US 2006/0230353 A1     Oct. 12, 2006

Related U.S. Application Data

(63) Continuation of application No. 10/428,356, filed on May 2, 2003, now Pat. No. 7,281,212, which is a continuation of application No. 09/956,169, filed on Sep. 18, 2001, now Pat. No. 7,043,694, which is a continuation of application No. 09/207,393, filed on Dec. 8, 1998, now Pat. No. 6,295,055, which is a continuation of application No. 08/328,394, filed on Oct. 24, 1994, now Pat. No. 6,219,048, which is a continuation of application No. 07/790,327, filed on Nov. 12, 1991, now abandoned.

(51) Int. Cl.
*G06F 3/00* (2006.01)
(52) U.S. Cl. .................. 715/716; 715/764; 715/856
(58) Field of Classification Search ................ 715/719, 715/764, 856, 716, 717, 721, 201–203, 859, 715/862, 727; 345/642, 625, 627, 622, 547, 345/555, 619, 620, 545, 546
See application file for complete search history.

(56) References Cited

U.S. PATENT DOCUMENTS

| | | | | | |
|---|---|---|---|---|---|
| 4,601,003 | A | * | 7/1986 | Yoneyama et al. | 715/775 |
| 4,941,111 | A | * | 7/1990 | Sfarti | 345/620 |
| 4,977,518 | A | * | 12/1990 | Bonnet et al. | 345/530 |
| 5,021,770 | A | * | 6/1991 | Aisaka et al. | 345/156 |
| 5,107,252 | A | * | 4/1992 | Traynar et al. | 345/634 |

(Continued)

*Primary Examiner*—Sy D Luu
(74) *Attorney, Agent, or Firm*—Blakely, Sokloff, Taylor & Zafman LLP

(57) ABSTRACT

A method for labeling the pixels within a selected visual area of at least one image frame containing that visual area from a sequence of image frames stored in memory and operative to be displayed on an interactive display so that a user may subsequently select the selected visual area on a pixel accurate, frame accurate basis. To label the selected visual area within an image frame, the scene within that image frame is segmented to identify the selected visual area, each pixel within that selected visual area is then labeled with an area identifier which is unique to that selected visual area, and the pixels containing the area identifiers are mapped into an item buffer. The item buffer is then compressed and stored within a labeled portion of memory linked with the stored frame image from which the item buffer was derived. When a user subsequently selects a pixel within any frame image of the sequence of frame images the pixel is decompressed within the labeled portion of memory corresponding to the pixel in the selected frame image to determine the area identifier for the selected pixel. This area identifier is then used for a number of purposes, such as to identify an area within the frame image corresponding to the selected pixel, or to cause some action related to the selected pixel to be performed.

59 Claims, 6 Drawing Sheets

U.S. PATENT DOCUMENTS

| | | | |
|---|---|---|---|
| 5,119,474 A * | 6/1992 | Beitel et al. | 715/203 |
| 5,155,806 A * | 10/1992 | Hoeber et al. | 715/711 |
| 5,174,759 A * | 12/1992 | Preston et al. | 434/317 |
| 5,208,909 A * | 5/1993 | Corona et al. | 345/642 |
| 5,237,648 A * | 8/1993 | Mills et al. | 715/723 |
| 5,274,753 A * | 12/1993 | Roskowski et al. | 345/546 |
| 5,307,457 A * | 4/1994 | Beitel et al. | 715/860 |
| 5,317,680 A * | 5/1994 | Ditter, Jr. | 345/630 |
| 5,388,197 A * | 2/1995 | Rayner | 715/723 |
| 5,483,296 A * | 1/1996 | Nonweiler | 348/719 |
| 5,524,193 A * | 6/1996 | Covington et al. | 715/210 |

\* cited by examiner

OBJECT SELECTION USING HIT TEST TRACKS

The present application is a continuation of U.S. patent application Ser. No. 10/428,356, filed May. 2, 2003, now U.S. Pat. No. 7,281,212 which is a continuation of U.S. patent application Ser. No. 09/956,169, filed Sep. 18, 2001, now U.S. Pat. No. 7,043,694, which is a continuation of U.S. patent application Ser. No. 09/207,393, filed Dec. 8, 1998, now U.S. Pat. No. 6,295,055, which is a continuation of U.S. patent application Ser. No. 08/328,394, filed Oct. 24, 1994, now U.S. Pat. No. 6,219,048, which is a continuation of U.S. patent application Ser. No. 07/790,327 filed Nov. 12, 1991, now abandoned. The above-identified applications are herein incorporated by references.

FIELD OF THE INVENTION

The present invention relates generally to methods for selecting objects from a moving image sequence of digitized or synthesized images, and more particularly, to a technique for storing auxiliary data in an item buffer, along with a video track, so as to precisely identify objects which can be selected from within each frame of the video track.

BRIEF DESCRIPTION OF PRIOR ART

Object selection methods allow a user to select an individual object from among a group of objects in an image. One approach to object selection centers around determining which line segment on a two-dimensional screen image has been selected by a user. Typically, these line segments are connected to form a polygonal region, but they may also not be connected at all. One method, called "cursor picking", which is described by J. D. Foley and A. Van Dam, in "Fundamentals of Interactive Computer Graphics", Addison-Wesley Publishing Company, 1984, pps. 200-204, creates bounded extents, which can be checked using simple equations. Such a scheme, for example, would allow a user to select and modify the characteristics of a particular triangle on a screen, even though there may be many other objects, such as circles, trapezoids, and arbitrary polygonal regions, also visible on the screen. Another method for object selection is to have an object name associated with every object in a scene. To make an object an active selection, the user simply types in the object name that they want to select. This method has no geometric correspondence.

Another technique typically utilized in interactive systems, such as Apple Computer Incorporated's HyperCard™ program, permits the user to identify a rectangular bounding region on the screen with a particular object, such as a button or field. The HyperCard program looks to see where the cursor location is when a selection is made and, at that time, searches for the object (such as a button or field) that has a bounding rectangle at that location. If no bounding rectangle encloses the cursor location, no object is selected. Conversely, if there is a bounding rectangle which encloses the object, the corresponding object is selected. All of the above techniques do not allow for accurate object selection of arbitrarily complex boundaries and can be difficult to use when attempting to identify object boundaries precisely.

Item buffers are generally used to speed up image synthesis algorithms, such as ray tracing or radiosity. They may also be used to identify single object three-dimensional surface areas for usage with interactive painting and lighting systems which manipulate two-dimensional images. When computing radiosity form factors, a hemi-cube algorithm is typically used to speed up the calculation. In this algorithm, five faces of a cube are rendered as item buffers which contain object tags. By counting the number of tagged pixels in the face images, the form factor is computed for a particular polygon when seen from the vertex of another polygon. A description of such a system is presented by Michael F. Cohen and Donald P. Greenberg, in "The Hemi-Cube: A Radiosity Solution for Complex Environments", Computer Graphics, #19, Vol. 3, Jul. 1985, pp. 31-40.

Ray tracing may be accelerated by scan-converting an "object tag" image into an item buffer. Then, for each pixel the ray from the camera corresponding to that pixel is assumed to intersect with the object whose tag is in that pixel. By using an item buffer the algorithm avoids performing any primary ray-object intersection tests. In this way, ray tracing is made more computationally efficient. A description of such a system is presented by Hank Weghorst. Gary Hooper, and Donald P. Greenberg, "Improved Computational Methods for Ray Tracing". ACM Transactions on Graphics, Vol. 3, No. 1, Jan. 1984, pp. 52-69.

In "Direct WYSIWYG Painting and Texturing on 3D Shapes," by Pat Hanrahan and Paul Haeberli, Computer Graphics, Vol. 24, No. 4, Aug. 1990, pp. 215-223, a single three-dimensional object is rendered into an "id buffer" which stores the surface u-v values for the visible surface in that pixel. When painting onto the image, the surface position and surface normal vectors are determined by examining the object id buffer and then the result is used to shade the pixel as the texture maps are modified. This method allows a user to paint on an image in two dimensions and allows modification of the object geometry or lighting in three-dimensional space. The resultant modification is computed in three-dimensional space and then calculated as two-dimensional screen pixels, which are selectively written into the visible screen buffer.

BRIEF SUMMARY OF THE INVENTION

A preferred embodiment of the present invention comprises a method for labeling the pixels within a selected visual area of at least one image frame containing that visual area from a sequence of image frames stored in memory and operative to be displayed on an interactive display so that a user may subsequently select the selected visual area on a pixel accurate, frame accurate basis. To label the selected visual area within an image frame, the scene within that image frame is segmented to identify the selected visual area, each pixel within that selected visual area is then labeled with an area identifier which is unique to that selected visual area, and the pixels containing the area identifiers are mapped into an item buffer. The item buffer is then compressed and stored within a labeled portion of memory linked with the stored frame image from which the item buffer was derived. When a user subsequently selects a pixel within any frame image of the sequence of frame images the pixel is decompressed within the labeled portion of memory corresponding to the pixel in the selected frame image to determine the area identifier for the selected pixel. This area identifier is then used for a number of purposes, such as to identify an area within the frame image corresponding to the selected pixel, or to cause some action related to the selected pixel to be performed.

BRIEF DESCRIPTION OF THE DRAWING

FIG. 2b illustrates a single frame of a hit test track corresponding to the video track of FIG. 2a;

FIG. 4b illustrates the optional contents of the user data section of the hit test track of FIG. 4a.

DETAILED DESCRIPTION OF PREFERRED EMBODIMENT

Figure 1:
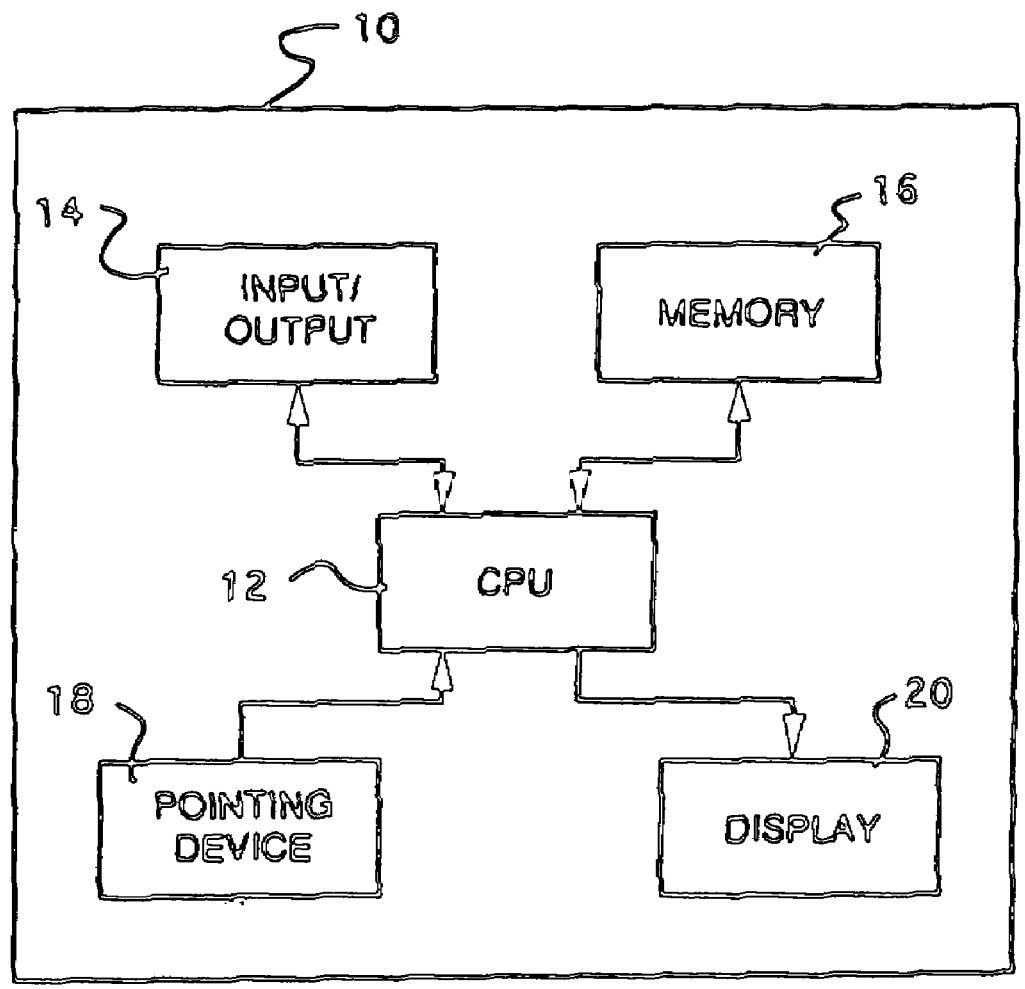
FIG. 1 is a block diagram illustrating a computer for use in conjunction with the preferred embodiment of the present invention.

The personal computer is becoming a more effective tool for presenting multimedia works everyday. Many of the techniques for presenting and using multimedia information in such computers are carried out in software, although hardware products could also be developed, albeit at much greater costs, for carrying out the same functions. With respect to the preferred embodiment of the present invention, hardware could also be developed which would implement the present invention, but software techniques operating in conjunction with the computer system 10 of FIG. 1 are preferably utilized herein to most effectively implement the present invention.

The computer 10, such as an Apple Macintosh computer manufactured by Apple Computer, Inc., Cupertino, Calif. is comprised of a central processing unit 12, an input/output 14, a memory 16, a pointing device 18 and a display 20. Preferably, CPU 12 is powerful enough to carryout data compression/decompression in software at reasonable speeds, such as is possible with a Motorola 68020 microprocessor running at a clock rate of at least 16 MHz, but other much lower performance processors running at lower clock speeds could also be used with acceptable performance if additional data compression/decompression hardware were included as part of the computer system 10. Input/output 14 connects CPU 12 to auxiliary devices, such as speakers, and auxiliary sources of data and memory, such as a hard disk storage device, a CD-ROM, or a high bandwidth network. Even with highly efficient compression techniques, substantial auxiliary storage would still be required for the audio, video and hit test tracks of the present invention. Memory 16 would typically include some type of mass storage as well as some random access memory, although other types of fast access memory could also be utilized. Pointing device 18 could be any of a number of such devices, such as a mouse, trackball, or stylus. Display 20 would preferably be any display having sufficient resolution to clearly display the video information.

Figure 2A:
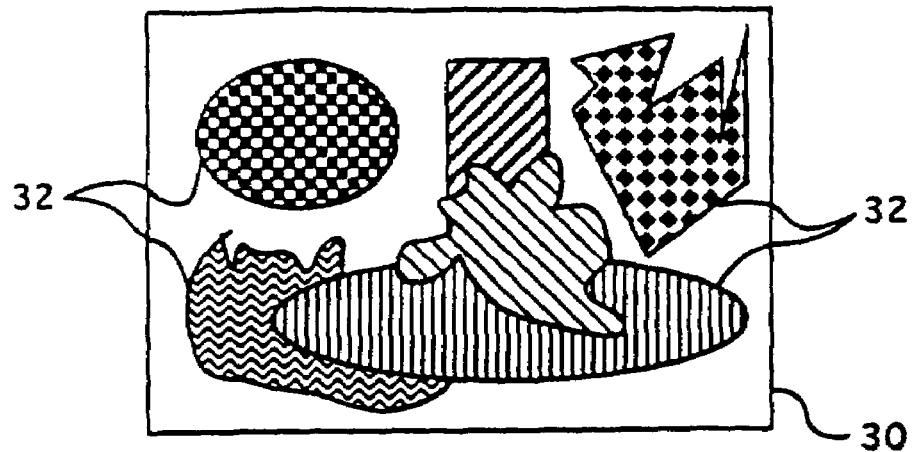
FIG. 2a illustrates a single frame of a video track.

Video data used in multimedia works is typically formed from a series of single frames of visual information sequentially strung together for playback by computer 10. This video data is typically stored in an auxiliary storage device as a video track along with other forms of temporal data associated with it, such as an audio track. FIG. 2a illustrates a single frame 30 of a video track, comprised of a number of distinct objects 32, as visible to a viewer on the display 20. The video track can either be precalculated as synthetic or computer generated imagery, or alternatively, as a video sequence that has been digitized from analog video data. This video image sequence can either be in a compressed or uncompressed format. As utilized herein, "video frame" means any analog image frame or any digitized frame captured with a scanner or camera or created using a paint program or renderer.

Figure 2B:
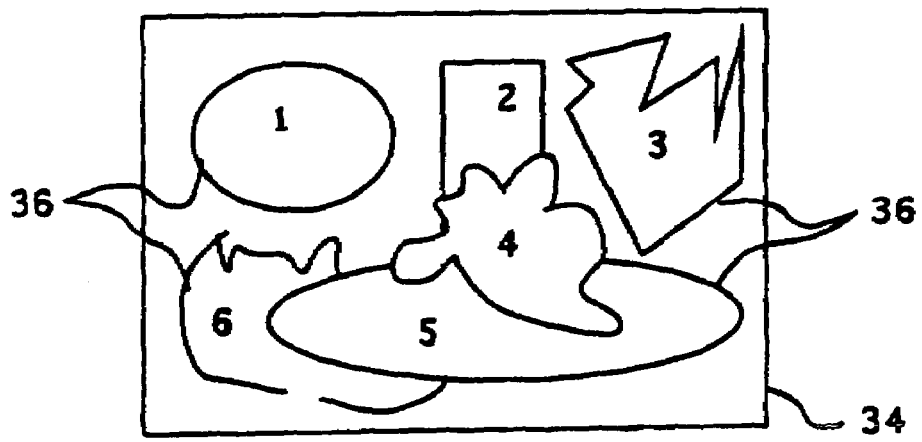

FIG. 2b illustrates a single frame 34 of an image called an "item buffer" which is stored as a compressed frame in a hit test track corresponding to the video frame 30 of FIG. 2a. The frames 34 corresponding to the hit test track, unlike frame 30 of the video track, would not be visible to a user on the display 20. Rather, the hit test track, as will be further explained below, is an auxiliary track of data which corresponds to the video track and which identifies (maps) the location of objects, or user defined areas, within the video track on a per pixel per frame basis. Although FIG. 2b illustrates each of the numbered objects 36 in frame 34 corresponding to an identically shaped object 32 in the frame 30, objects 36 in the hit test track could be created which correspond to any abstract user selected area in the frame 30, whether visible or not. For example, if frame 30 illustrated a room with some paintings, an open doorway, and a statue, it may be desirable to associate an object 36 from the hit test track with each of the paintings, the statute, and the abstract open area of the doorway. Regardless of the objects or areas selected by the user, the auxiliary hit test track of the present invention is most useful for what is commonly called "object picking", where the user of the computer 10 can select an object on the display 20 using pointing device 18 in any frame of a moving image sequence, thereby causing the system to initiate an action based on the selected object. The initiated action can be any of a large number of different actions, such as the playback of a separate multimedia work or the performance of a subroutine program. As will be further illustrated below, since the hit test data corresponds to visual objects on a per pixel, per frame basis, object selection is highly accurate.

Figure 3A:
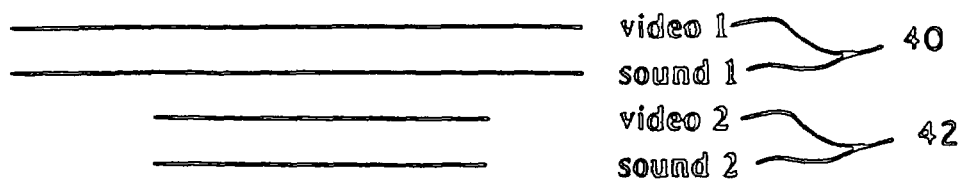
FIG. 3a illustrates a set of video tracks and sound tracks.
Figure 3B:
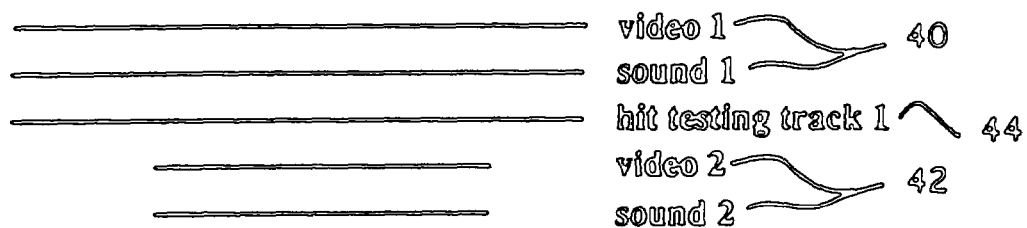
FIG. 3b illustrates the same multi-track data as FIG. 3b, but includes a hit test track.

The present invention is ideally suited for use in a computer 10 capable of operating multimedia type computer programs, such as a software program that is designed to manipulate various forms of media represented as a series of related temporal tracks of data (such as video, sound, etc.), each of those tracks being operative to be offset by some fixed time from the other tracks. A set of such tracks being herein referred to as a multi-track movie. A representation of a small multi-track movie is illustrated in FIG. 3a, which is comprised of a first set of video and sound tracks 40 and a second set of video and sound tracks 42. In each case, the temporal video track duration is the same as the temporal sound duration. The second set of video and sound tracks has a shorter duration than the first set and begins with a fixed time offset after the start of the first set. In FIG. 3b, the same set of multi-track movie data is represented, except that there is also a hit test track 44 stored in the movie. In this case, the hit test track corresponds to the first set of video and sound tracks, has the same duration as the first set, contains the same number of frames as the video track of the first set, and identifies the location of objects in the image sequences comprising the video track of the first set.

It should be noted that the video track and the corresponding hit test track will be, in the most general case, a sequence of moving images. However, it is also possible to use the techniques of the present invention on just a single image, in which case each track comprises only a single frame. It should also be noted that the hit test track need not be compressed using the same compression techniques as the video track and need not be stored at precisely the same resolution as the video track. The hit test track is preferably compressed using a lossless data or image compression technique which need not conform to that of the video track. In addition, if the video track happens to be highly compressed, it may make sense to use a subsampled, or coarser grid, version of the hit test track (such as subsampling on the order of 2:1 or 4:1). In such an event, on playback, the nearest available object identification value in the coarse grid version of the hit test track is used as the object identifier. Although this alternative embodiment will not have the pixel accurate advantage of the full resolution hit test track, it still permits the user to select most objects in the scene at an acceptable level of precision.

Figure 4A:
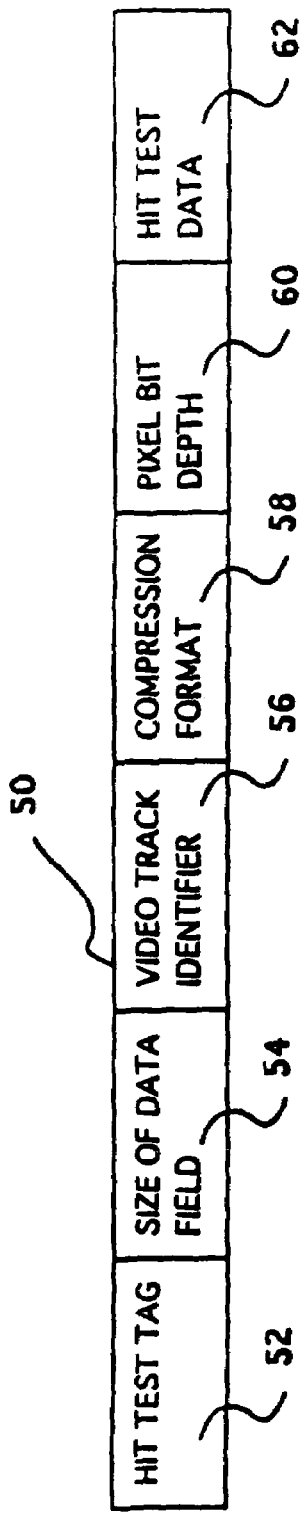
FIG. 4a illustrates the required contents of the user data section of a hit test track in accordance with the preferred embodiment of the present invention.

With respect to the preferred embodiment of the present invention, any track of the multi-track movie has the option of having an associated set of auxiliary, hit test track, information. This auxiliary information is typically stored along with the corresponding track of the multi-track movie as a set of tag, size and data fields that are used to facilitate manipulation of the temporal data contained in that hit test track. Since these fields are user or application defined, they are referred to herein as "user data". This user data is static, meaning it doesn't change over time. The organization and content of the user data for a hit test track, shown generally as 50, is illustrated in FIG. 4a. The hit test tag 52 is an identifier that designates the track as a hit test track. In the presently preferred embodiment of the present invention, the four character tag field is represented by the characters "HIT_", wherein "_" represents a space. The hit test track is marked with this tag field to distinguish the hit test track from video data. Hence, when computer 10 is interpreting the track data, it will know to only use the hit test track to identify objects which lie in the video scene. The next field in the hit test track 50 is the size of the data field 54, which indicates the number of bytes of information in the data field.

The remaining portions of information contained in hit test track 50 are within the data field, which is preferably comprised of video track identifier 56, compression format 58, pixel bit depth 60 and hit test data 62. The video track identifier 56 describes the video track in a multi-track movie to which the hit test track 50 corresponds. Utilization of a video track identifier 56 allows the computer 10 to know which video track is used in conjunction with the hit test track. Such information can be important where there are a number of hit test tracks which refer to the same video track. Compression format 58 indicates the format utilized to compress the hit test data 62.

As previously stated, although a number of different compression formats can be utilized for both the video track and the hit test data 62, the preferred embodiment for the hit test data 62 is lossless data encoding. There are a number of applicable methods of lossless encoding that may be employed, including run-length encoding, quad-tree coding, or Huffman coding, all of which are well known in the art. By indicating the compression format, the computer 10 may readily determine how to decompress the hit test data. Pixel bit depth 60 indicates the pixel bit depth to which the compressed data is to be decompressed. This feature allows for correct interpretation of the word length of the hit test data 62. It should be noted that compact descriptions of the objects in the hit test track 50, other than compression techniques, can be utilized. For example, it may be desirable to store a geometric description of the objects in the hit test track 50. This list of geometric primitives for hit test regions would likewise correspond to each frame in the original video track.

It should also be noted that hit test track 50 need not include all of the above-described portions in order to be fully operable. Rather than include an indication of the compression format 58 or the pixel bit depth 60, there could be a default compression format utilized by computer 10 which automatically provided that information. For example, the presents invention could take advantage of the compression formats offered by a software program which manipulates (including compression and decompression) multi-track movies, whereby computer 10 would automatically know to handle various types of data in accordance with various types of compression formats.

Figure 4B:
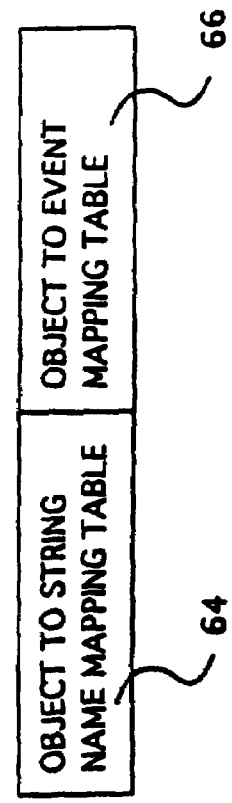

In addition to the portions of information described above contained within the data field of hit test track 50, there are other portions of information which could be included therein. Two such portions are described below with reference now to FIG. 4b. Object to string name mapping table 64 could be utilized to associate ascii string names with particular objects in the corresponding video or sound track. For example, it may be desirable to store the name "cube" in the hit test track corresponding to every pixel of a video image containing a cube. A likely table construct would contain a list of a series of numbers and associated name strings, such as ((1.cube), (2.painting), (3,chair), (4,blob), etc.). These names can then be passed on to a scripting environment for further interpretation or usage. Object to event mapping table 66 could likewise be utilized to associate events with particular objects. For example, it may be desirable to initiate the event "play movie scene 3" whenever a user uses the cursor on the display 20 under the control of the pointing device 18 to select a pixel containing a particular object. A likely table construct would contain a list of a series of numbers and associated event strings, such as ((1, "play movie X"), (2,"play sound Y"), (3,"go to screen 10"), (4,"play movie Z"), etc.). These events could also then be, passed on to an interpretive scripting environment.

Although discussed in greater detail with reference to FIGS. 5 and 6, the operation of a computer 10 running a program which utilizes hit test tracks as part of a multi-track movie will now be briefly described. To determine when to access data in the hit test track, the program of computer 10 determines when a user has made a selection at a particular position on the screen of display 20 where the aforementioned cursor is displayed. The program then determines which frame of the video sequence is currently being displayed. At that point, the program interrogates each track of the multi-track movie to determine which track has the identifiers indicating it is a hit test track for the particular video track being displayed. Once the proper hit test track has been determined, the frame in the hit test track corresponding to the video frame currently being displayed is accessed and decompressed according to the particular compression format in which it is stored.

During decompression, only the region at or surrounding the pixel of interest is decompressed. When the exact pixel for object selection is identified, its decompressed value is returned to the program as the object's identifier. The object identifier can then be used to map into a name table or event table if so desired. If the object identifier maps into a name table, an ascii string name is returned to the program. If the object identifier maps into an event table, the "event" is returned to the system, which can trigger the occurrence of various events, such as the playing of a sound, the display of a sequence of video frames or a picture image on the screen of display 20. The event to be triggered and handled by the program, as mentioned above, is data contained in the event table. The meaning of those events will depend on what type of interactive environment is used on the program of interest. In the preferred embodiment of the present invention, events are to be interpreted by a high level scripting language.

Figure 5:
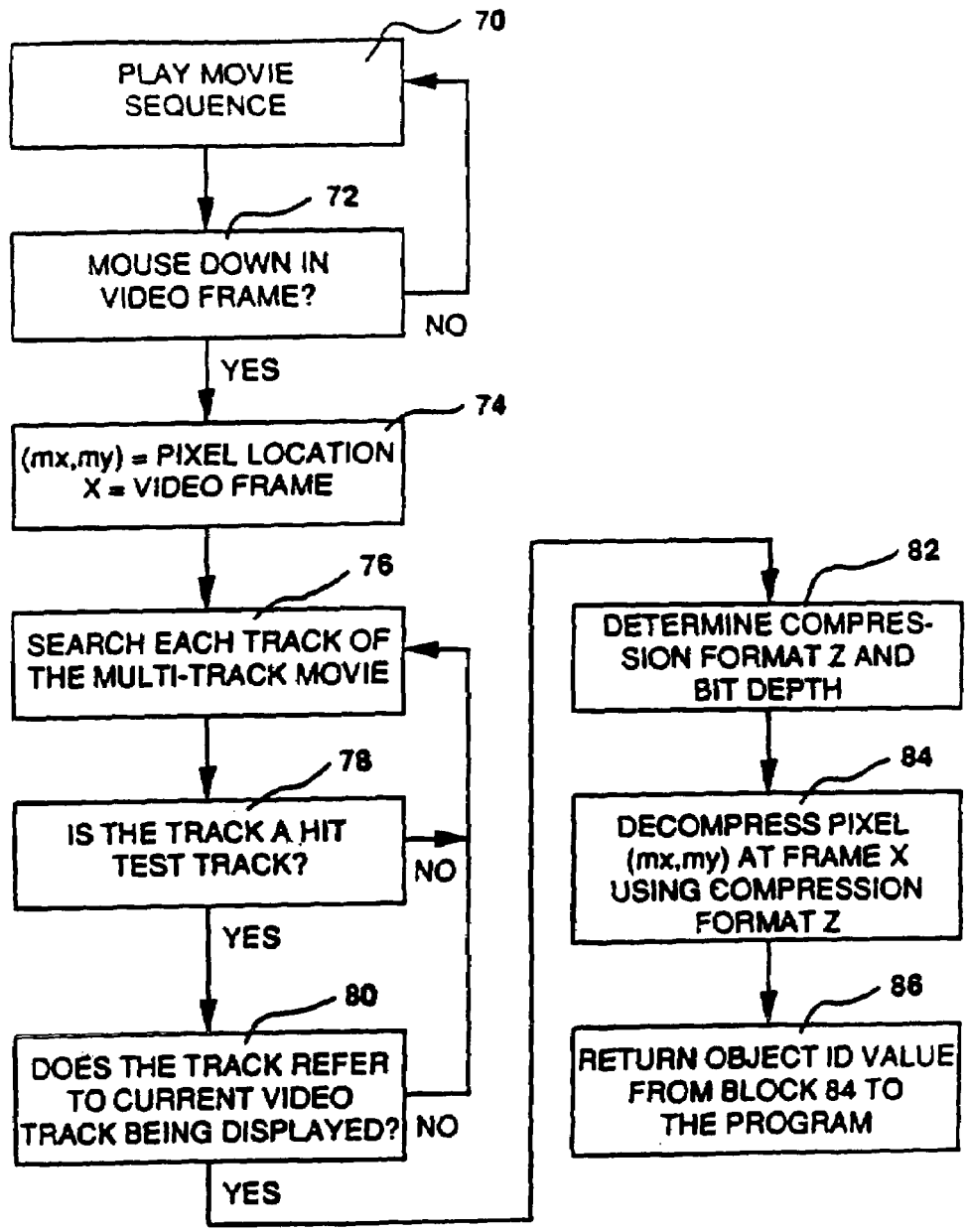
FIG. 5 is a flow chart illustrating the interactive playback of a movie sequence utilizing hit test tracks in accordance with the preferred embodiment of the present invention.

With reference now to FIG. 5, a flow chart illustrating the interactive playback of a movie sequence utilizing hit test tracks in accordance with the preferred embodiment of the present invention will now be described. As the frames of a moving image sequence from a video track is played back by computer 10, block 70, the program tests to see if a mouse down event has occurred in the video frame, block 72. If a mouse down event has occurred in a video frame, versus some other portion of visible space on the screen of display 20, the video frame X is recorded in memory 16, as is the mouse position (mx,my) at the time of the mouse down event, block 74. If no mouse down event has occurred, the program returns to block 70 to continue playing the movie sequence. After storing the video frame X and the mouse down position (mx,my), the program proceeds to search the user data fields of all of the tracks of the multi-track movie for any track that has the hit test track identifier or tag "HIT_", block 76.

When a track identified as hit test track has been found, block 78, the program reviews the user data of the hit test track to verify that the identified hit test track refers to the current video track being displayed, block 80. If the hit test track refers to the current video track, the program then determines the compression format Z, unless there is a default compression format and the bit depth at which to decompress the data, block 82. The next step in the process is to decompress the appropriate frame X (corresponding to the video frame X in the sequence) of the hit test track using the decompression method Z. Although the decompression that occurs can be of the full video frame X, it is preferable to lust decompress the region surrounding the exact pixel location (mx,my) selected by the user in the video frame X, block 84. Note that the object identifier value for the selected object would be the same regardless of the pixel location within the object selected by the user. Thus, while decompressing the entire object would certainly produce the appropriate object identifier, decompressing just the pixel location selected would achieve the same result. The object identifier value of the decompressed data at pixel location (mx,my) is then returned to the system, block 86. As previously described above, more complex optional versions of the above process can decompress the hit test data and use the object identifier to map into a table, which returns either an ascii name or an event to be triggered by the program.

Figure 6:
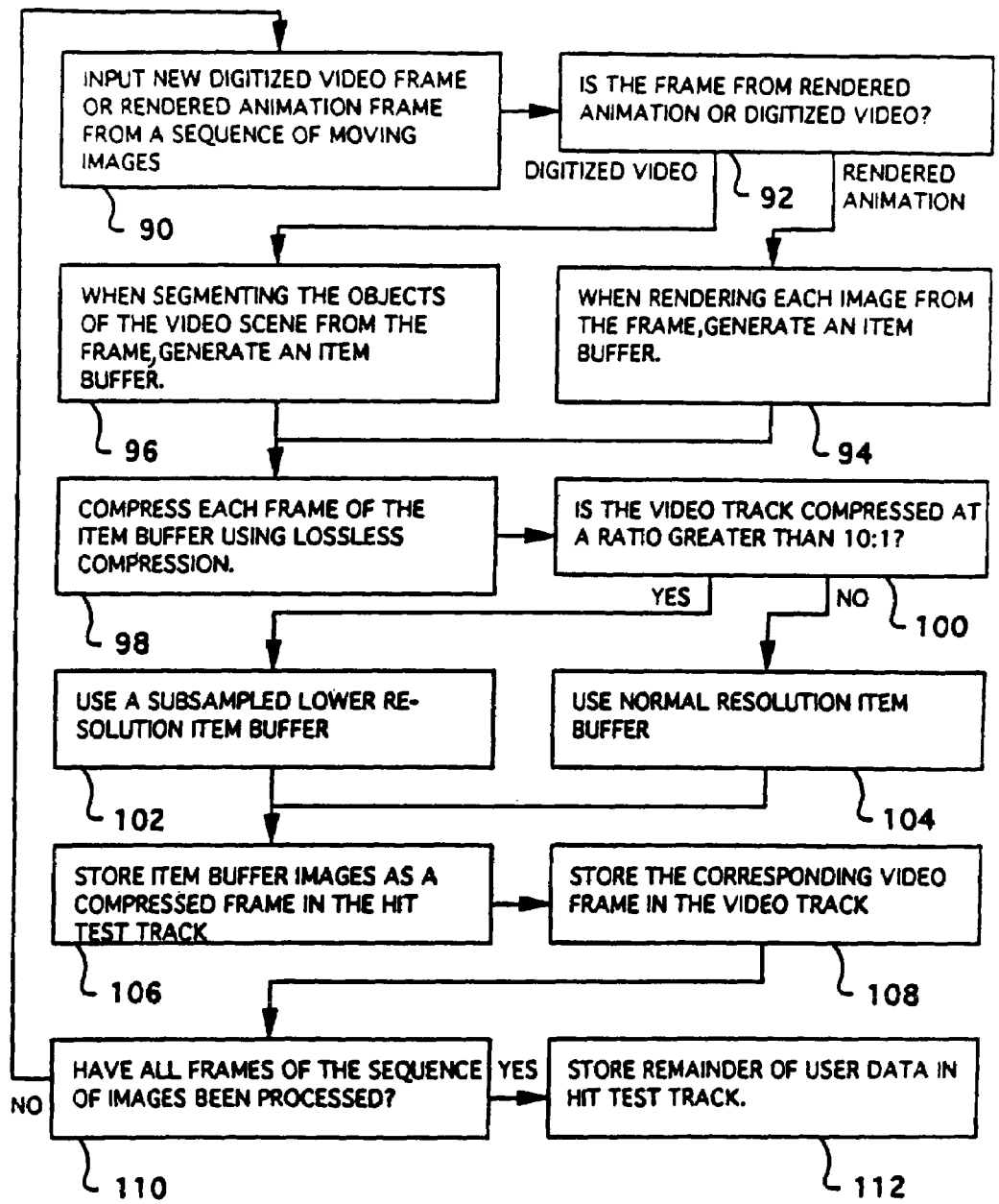
FIG. 6 is a flow chart illustrating the creation of hit test tracks for multi-track movies in accordance with the preferred embodiment of the present invention.

With reference now to FIG. 6, a flow chart illustrating the creation of hit test tracks for multi-track movies in accordance with the preferred embodiment of the present invention will be described. In block 90, a newly digitized video frame or a rendered animation frame from a sequence of moving images is input. The program then looks to see if the input frame is from rendered animation or digitized video, block 92. If the input frame is from rendered animation, an item buffer is generated for the frame when rendering the from the sequence, block 94. As previously discussed, this item buffer, which is later incorporated into the hit test track, is used as a map of all of the objects in the scene by labeling each pixel which is contained within the area defining that object with an item number or object identifier. Note that pixels within the same object or area of interest would contain the same object identifier.

If the input frame is from digitized video, the objects in the video scene depicted in the video frame are segmented, using pattern recognition techniques or through manual object tracking, to generate an item buffer for that scene, block 96. Although pattern recognition techniques are less labor intensive than manual object tracking, the effectiveness of pattern recognition, and therefore object identification, can vary significantly depending on the subject matter being recognized. In addition, manual object tracking has the added advantage of allowing the user to specify "invisible" areas of interest in addition to visible objects of interest. Regardless of the type of input data, once an item buffer is created, each item buffer is then compressed using lossless compression, block 98. The program then looks, block 100, to see if the video track corresponding to that item buffer is compressed at a ratio greater than a predetermined threshold, such as 10:1. As previously discussed, if the video track happens to be highly compressed, it may make sense to use a subsampled, or coarser grid, version of the item buffer, such as subsampling on the order of 2:1 or 4:1. Hence, in block 102, a subsampled lower resolution version of the compressed item buffer is used in place of a normal resolution item buffer, as is utilized in block 104. Again, it should be noted that when a subsampled lower resolution item buffer is utilized, on playback, the nearest available object identification value in the coarse grid version of the hit test track is used as the object identifier.

Regardless of the type of item buffer used, in block 106, the images in each item buffer are then stored as a compressed frame in the hit test data portion of a hit test track. The video frame corresponding to that hit test track is then stored in the video track, block 108. This process continues for each frame of the sequence of images until all frames of the sequence have been processed, block 110, at which point, the remainder of the user data, such as the hit test tag 52; the size of the data field 54, the video track identifier 56, the lossless compression format 58, and the pixel bit depth 60, are stored in the hit test track 50, block 112.

It should be noted that the present invention has many applications related to video display and manipulation technologies, such as the multimedia applications described above, but also in other areas, such as video games, where pixel accurate, frame accurate object selection would be desirable. Hence, although the present invention has been described with reference to FIGS. 1 through 6 and with emphasis on a particular embodiment, it should be understood that the figures are for illustration only and should not be taken as limitations upon the invention. It is contemplated that many changes and modifications may be made by one of ordinary skill in the art to the elements, process and arrangement of steps of the process of the invention without departing from the spirit and scope of the invention as disclosed above.

We claim:

1. A machine readable storage medium for use with a data processing system, comprising:
    one or more tracks for storing data, at least one of the tracks having stored therein a data stream representing a sequence of temporally related images that are readable and playable by the data processing system as a movie, wherein the data stream includes identification data identifying a user selectable area within at least one of the temporally related images.

2. The machine readable storage medium of claim 1, wherein the identification data is stored in a designated area of the at least one of the tracks having stored therein the data stream representing the sequence of temporally related images and wherein, as the movie plays, the user selectable area moves over time.

3. The machine readable storage medium of claim 1, wherein the identification data identifies the user selectable area based on a location of the at least one of the temporally related images selected by the user.

4. The machine readable storage medium of claim 1, wherein when the at least one of the temporally related images is played by the data processing system as a movie, the user selectable area allows a viewer to select at least a portion of contents within the user selectable area.

5. The machine readable storage medium of claim 4, wherein a selection of the viewer is performed within a frame of a moving image sequence represented by the at least one of the temporally related images.

6. The machine readable storage medium of claim 4, wherein in response to a selection of the viewer within the user selectable area, the data processing system performs a predetermined action.

7. The machine readable storage medium of claim 6, wherein the predetermined action is initiated based on an event of a scene associated with a location selected by the viewer of the user selectable area.

8. The machine readable storage medium of claim 6, wherein the predetermined action is initiated based on an object selected by the viewer within the user selectable area.

9. The machine readable storage medium of claim 6, wherein the predetermined action comprises playing back a predetermined sequence of images or audio sounds associated with the selected portion of contents within the user selectable area.

10. The machine readable storage medium of claim 6, wherein the predetermined action comprises executing a predetermined program subroutine associated with the selected portion of contents within the user selectable area.

11. The machine readable storage medium of claim 1, wherein the user selectable area includes at least a portion of an object within the at least one of the temporally related images.

12. The machine readable storage medium of claim 11, wherein the user selectable area is selected when the user selects the object within the at least one of the temporally related images.

13. The machine readable storage medium of claim 1, wherein the data stream further comprises description data describing at least a portion of the at least one of the temporally related images.

14. The machine readable storage medium of claim 1, wherein data associated with images of the movie is stored in a first track and the identification data is stored in a second track.

15. The machine readable storage medium of claim 14, wherein the second track is an auxiliary track associated with the first track.

16. The machine readable storage medium of claim 14, wherein the first and second tracks are stored in different compression formats.

17. The machine readable storage medium of claim 14, wherein the first track is uncompressed and the second track is compressed.

18. A machine implemented method, comprising:
reading a machine readable storage medium having one or more tracks for storing data, at least one of the tracks having stored therein a data stream representing a sequence of temporally related images, wherein the data stream includes identification data identifying a user selectable area within at least one of the temporally related images; and
playing the sequence of temporally related images as a movie in a display of a data processing system.

19. The method of claim 18, wherein the identification data is stored in a designated area of the at least of the tracks having stored therein the data stream representing the sequence of temporally related images and wherein, as the movie plays, the user selectable area moves over time.

20. The method of claim 18, wherein the identification data identifies the user selectable area based on a location of the at least one of the temporally related images selected by the user.

21. The method of claim 18, wherein when the at least one of the temporally related images is played by the data processing system as a movie, the user selectable area allows a viewer to select at least a portion of contents within the user selectable area.

22. The method of claim 21, wherein a selection of the viewer is performed within a frame of a moving image sequence represented by the at least one of the temporally related images.

23. The method of claim 21, wherein in response to a selection of the viewer within the user selectable area, the data processing system performs a predetermined action.

24. The method of claim 23, wherein the predetermined action is initiated based on an event of a scene associated with a location selected by the viewer of the user selectable area.

25. The method of claim 23, wherein the predetermined action is initiated based on an object selected by the viewer within the user selectable area.

26. The method of claim 23, wherein the predetermined action comprises playing back a predetermined sequence of images or audio sounds associated with the selected portion of contents within the user selectable area.

27. The method of claim 23, wherein the predetermined action comprises executing a predetermined program subroutine associated with the selected portion of contents within the user selectable area.

28. The method of claim 18, wherein the user selectable area includes at least a portion of an object within the at least one of the temporally related images.

29. The method of claim 28, wherein the user selectable area is selected when the user selects the object within the at least one of the temporally related images.

30. The method of claim 18, wherein the data stream further comprises description data describing at least a portion of the at least one of the temporally related images.

31. The method of claim 18, wherein data associated with images of the movie is stored in a first track and the identification data is stored in a second track.

32. The method of claim 31, wherein the second track is an auxiliary track associated with the first track.

33. The method of claim 31, wherein the first and second tracks are stored in different compression formats.

34. The method of claim 31, wherein the first track is uncompressed and the second track is compressed.

35. An apparatus for playing a movie, comprising:
means for reading a machine readable storage medium, the machine readable storage medium having one or more tracks for storing data, at least one of the tracks having stored therein a data stream representing a sequence of temporally related images, wherein the data stream includes identification data identifying a user selectable area within at least one of the temporally related images, wherein means for reading a machine readable storage medium includes a processor and a memory; and
means for playing the sequence of temporally related images as a movie in a display of a data processing system.

36. The apparatus of claim 35, wherein the identification data is stored in a designated area of the at least of the tracks having stored therein the data stream representing the sequence of temporally related images.

37. The apparatus of claim 35, wherein the identification data identifies the user selectable area based on a location of the at least one of the temporally related images selected by the user.

38. The apparatus of claim 35, wherein when the at least one of the temporally related images is played by the data processing system as a movie, the user selectable area allows a viewer to select at least a portion of contents within the user selectable area.

39. The apparatus of claim 38, wherein a selection of the viewer is performed within a frame of a moving image sequence represented by the at least one of the temporally related images.

40. The apparatus of claim 38, wherein in response to a selection of the viewer within the user selectable area, the data processing system performs a predetermined action.

41. The apparatus of claim 40, wherein the predetermined action is initiated based on an event of a scene associated with a location selected by the viewer of the user selectable area.

42. The apparatus of claim 40, wherein the predetermined action is initiated based on an object selected by the viewer within the user selectable area.

43. The apparatus of claim 40, wherein the predetermined action comprises playing back a predetermined sequence of images or audio sounds associated with the selected portion of contents within the user selectable area.

44. The apparatus of claim 40, wherein the predetermined action comprises executing a predetermined program subroutine associated with the selected portion of contents within the user selectable area.

45. The apparatus of claim 35, wherein the user selectable area includes at least a portion of an object within the at least one of the temporally related images.

46. The apparatus of claim 45, wherein the user selectable area is selected when the user selects the object within the at least one of the temporally related images.

47. The apparatus of claim 35, wherein the data stream further comprises description data describing at least a portion of the at least one of the temporally related images.

48. The apparatus of claim 35, wherein data associated with images of the movie is stored in a first track and the identification data is stored in a second track.

49. The apparatus of claim 48, wherein the second track is an auxiliary track associated with the first track.

50. The apparatus of claim 48, wherein the first and second tracks are stored in different compression formats.

51. The apparatus of claim 48, wherein the first track is uncompressed and the second track is compressed.

52. A data processing system, comprising:
a processor; and
a memory for storing instructions, which when executed from the memory, cause the process to perform operations, including
reading a machine readable storage medium having one or more tracks for storing data, at least one of the tracks having stored therein a data stream representing a sequence of temporally related images, wherein the data stream includes identification data identifying a user selectable area within at least one of the temporally related images, and
playing the sequence of temporally related images as a movie in a display of a data processing system.

53. A machine readable storage medium for use with a data processing system, comprising:
one or more tracks for storing data, at least one of the tracks having stored therein a data stream representing a sequence of temporally related images that are readable and playable by the data processing system as a movie, wherein the sequence of temporally related images includes a user selectable area within at least one of the temporally related images,
wherein when the sequence of temporally related images is played by the data processing system as a movie, the user selectable area allows a user to select at least a portion of contents within the user selectable area, and wherein in response to a selection of the user, the data processing system is configured to perform a predetermined action.

54. A machine implemented method, comprising:
reading a machine readable storage medium having one or more tracks for storing data, at least one of the tracks having stored therein a data stream representing a sequence of temporally related images that are readable and playable by the data processing system as a movie, wherein the sequence of temporally related images includes a user selectable area within at least one of the temporally related images;
playing the sequence of temporally related images as a movie in a display of the machine; and
in response to a selection of a user for selecting at least a portion of contents within the user selectable area, performing a predetermined action associated with the selected portion of contents.

55. An apparatus, comprising:
means for reading a machine readable storage medium, the machine readable storage medium having one or more tracks for storing data, at least one of the tracks having stored therein a data stream representing a sequence of temporally related images that are readable and playable by the data processing system as a movie, wherein the sequence of temporally related images includes a user selectable area within at least one of the temporally related images, wherein means for reading a machine readable storage medium includes a processor and a memory;
means for playing the sequence of temporally related images as a movie in a display of machine; and
in response to a selection of a user for selecting at least a portion of contents within the user selectable area, means for performing a predetermined action associated with the selected portion of contents.

56. A machine readable storage medium for use with a machine, comprising:
a plurality of tracks for storing a data stream representing a sequence of temporally related images that are readable and playable by the machine as a movie,
wherein at least a portion of data stream stored in at least two of the plurality of tracks is stored in different compression formats, and wherein at least one of the tracks comprises data identifying a user selectable area presented within at least one of the temporally related images.

57. A machine implemented method, comprising:
reading a machine readable storage medium having a plurality of tracks for storing a data stream representing a sequence of temporally related images that are readable and playable by a machine as a movie, wherein at least a portion of data stream stored in at least two of the plurality of tracks is stored in different compression formats; and
playing the sequence of temporally related images as a movie in a display of a data processing system, including decompressing the compressed portion of the data stream, wherein at least one of the tracks comprises data identifying a user selectable area presented within at least one of the temporally related images.

58. An apparatus, comprising:
means for reading a machine readable storage medium, the machine readable storage medium having a plurality of tracks for storing a data stream representing a sequence of temporally related images that are readable and playable by a machine as a movie, wherein at least a portion of data stream stored in at least two of the plurality of tracks is stored in different compression formats, wherein means for reading a machine readable storage medium includes a processor and a memory; and means for playing the sequence of temporally related images as a movie in a display of a data processing system, including decompressing the compressed portion of the data stream, wherein at least one of the tracks comprises data identifying a user selectable area presented within at least one of the temporally related images.

59. A data processing system, comprising:

a processor; and a memory for storing instructions, which when executed from the memory, cause the process to perform operations, including reading a machine readable storage medium having a plurality of tracks for storing a data stream representing a sequence of temporally related images that are readable and playable by the data processing system as a movie, wherein at least a portion of data stream stored in at least two of the plurality of tracks is stored in different compression formats, and playing the sequence of temporally related images as a movie in a display of a data processing system, including decompressing the compressed portion of the data stream, wherein at least one of the tracks comprises data identifying a user selectable area presented within at least one of the temporally related images.

* * * * *